UNITED STATES PATENT OFFICE.

ARTHUR EICHENGRÜN, OF ELBERFELD, GERMANY, ASSIGNOR TO THE FARBENFABRIKEN OF ELBERFELD COMPANY, OF NEW YORK.

PHARMACEUTICAL COMPOUND.

SPECIFICATION forming part of Letters Patent No. 615,970, dated December 13, 1898.

Application filed September 22, 1897. Serial No. 652,630. (Specimens.)

*To all whom it may concern:*

Be it known that I, ARTHUR EICHENGRÜN, doctor of philosophy, a subject of the German Emperor, residing at Elberfeld, Germany, (assignor to the FARBENFABRIKEN OF ELBERFELD COMPANY, of New York,) have invented a new and useful Improvement in the Manufacture of Pharmaceutical Compounds; and I do hereby declare the following to be an exact and clear description of my invention.

My invention relates to the production of a new class of soluble protein substances which contain silver. It is known that by the action of silver salts or of silver oxide on solutions of protein substances, such as egg albumin or the like, insoluble protein silver compounds are precipitated, which, owing to their insolubility, are only of little value for medicinal purposes. I have now found a process of transforming these insoluble compounds into other products which are readily soluble in water and represent very valuable remedies. This transformation is effected by treating the said insoluble compounds with watery solutions of albumoses, such as protalbumose, deuteroalbumose, (see *Neumeister's Manual on Physiological Chemistry*, second edition, 1897, on page 231,) or the like.

My new process applies to all kinds of insoluble protein silver compounds, which, as above mentioned, are obtained by acting with silver salts or silver oxide on the different kinds of protein substances. Under the expression "protein substances" I understand not only the natural protein substances—such as the different kinds of animal or vegetable albumins, albumoses, peptones, or the like—but also artificial derivatives of the said protein substances—such, for instance, as the so-called "methylene compounds," which are obtained by acting on solutions of natural protein substances with solutions of formic aldehyde. It may be remarked that the last-mentioned methylene compounds, which are soluble in water, can be obtained in the following manner: A cold concentrated watery solution of one of the above-mentioned natural protein substances, such as protalbumose or the like, is mixed with a small quantity of a formic-aldehyde solution. After about twenty-four hours the reaction will be finished, the whole solution being transformed into a gelatinous mass, which is dried at low temperature. The dry residue thus obtained is the new methylene derivative from protalbumose and represents after being pulverized a yellowish powder soluble in water. In an analogous manner the methylene derivatives of the other natural protein substances can be produced. If solutions of these methylene protein substances are allowed to act on silver salts or on silver oxide, insoluble precipitates are obtained which are very similar to those produced by the action of silver compounds on solutions of natural protein substances. These insoluble compounds can likewise be transformed into soluble silver protein substances by means of my new process—that is to say, by a treatment with solutions of albumoses.

The new soluble silver protein substances obtainable by means of my new process from all the different insoluble protein silver compounds hereinbefore referred to represent amorphous yellowish-colored powders soluble in water, with a yellowish color, and insoluble in alcohol, in ether, in benzene, and in chloroform. On adding a diluted solution of alkalies to the watery solution of the new silver compounds no precipitate is separated, as is the case if an alkali is added to the solution of a silver salt. The new compounds contain the silver so intimately combined with the protein molecule that it cannot be split off even by means of hydrochloric acid. On adding concentrated hydrochloric acid to the watery solution of one of my silver compounds it is true a precipitate results, which, however, is not silver chloride, but the unchanged silver compound which follows, from the fact that it is redissolved on the addition of water. Owing to the fact that the silver is so intimately combined with the protein molecule of my new compounds they exhibit no irritating action on the mucous membranes even when applied in a concentrated solution. Nevertheless the antiseptic action of the silver contained therein is not diminished. For these reasons the new compounds can profitably be used in medicine.

In carrying out my new process practically I can proceed as follows: 4.4 kilos, by weight, of deuteroalbumose dissolved in six liters of water are stirred into the solution of one kilo, by weight, of silver nitrate in 1.5 liters of water. The white voluminous precipitate which is separated by means of this operation is filtered, washed with water, and subsequently stirred into a warm solution prepared from 4.5 liters of water and five kilos, by weight, of protalbumose. By heating the resulting mixture on a water-bath, with continuous stirring, the insoluble silver compound is dissolved. The soluble product thus produced is separated from the solution by the addition of alcohol in the shape of a yellowish-white precipitate which is dried in vacuo. When dry and pulverized, it represents a yellowish powder easily soluble in water, with a yellowish color, insoluble in alcohol, in ether, in benzene, and in chloroform. On adding a diluted solution of sodium carbonate to the watery solution of the new silver compound no precipitate is separated, nor is a precipitate obtained on the addition of diluted hydrochloric acid (containing ten per cent. of HCl) to the watery solution; but if a small quantity of concentrated hydrochloric acid is added to the watery solution a white flaky precipitate is obtained which is soluble in water and in concentrated hydrochloric acid. The silver contained in the new compound can easily be recognized by heating the substance in a porcelain pan at high temperatures.

The new product exhibits in a high degree antiseptic properties without having any irritating action on the mucous membranes. On account of these two reasons it represents a valuable remedy against gonorrhea, as has been proved by a great number of experiments.

Having now described my invention and in what manner the same is to be performed, what I claim as new, and desire to secure by Letters Patent, is—

1. The process of producing new soluble protein silver substances from the insoluble silver compounds produced by the action of protein substances on silver compounds, employed for the preparation of silver salts of organic combinations, which process consists in dissolving the said insoluble silver compounds in solutions of albumoses, introducing into these solutions alcohol, by which means the new silver protein compounds are precipitated, filtering off the thus-obtained precipitates, and drying the same, substantially as described.

2. The process of producing a new soluble derivative of albumoses, containing silver, by completely dissolving the precipitate obtained by the action of a solution of albumoses on a solution of silver nitrate, in a solution of albumoses, introducing into this solution alcohol, by which means the new silver compound is precipitated, filtering the thus-obtained precipitate, and drying substantially as described.

3. As new article of manufacture the new silver protein substances obtainable from the insoluble silver protein substances and albumoses, being, when dry and pulverized, yellowish powders dissolving in water, yielding a yellowish solution, and containing silver so intimately combined with the protein molecule, that the watery solution does not separate any precipitate on the addition of dilute alkalies or of dilute hydrochloric acid containing about ten per cent. HCl, substantially as described.

4. As a new article of manufacture the specific compound obtainable from the insoluble silver albumose compound and albumoses, being, when dry and pulverized a yellowish powder insoluble in alcohol, ether, benzin and chloroform, easily soluble in water, yielding a yellowish solution, and containing silver so intimately combined with the albumose molecule that the aqueous solution does not separate any precipitate on the addition of dilute hydrochloric acid, containing about ten per cent. HCl, and that on the addition of a small quantity of concentrated hydrochloric acid a white, flaky precipitate is obtained, which is soluble in water and in concentrated hydrochloric acid, substantially as described.

In testimony whereof I have signed my name in the presence of two subscribing witnesses.

ARTHUR EICHENGRÜN.

Witnesses:
  R. E. JAHN,
  OTTO KÖNIG.